United States Patent
Kihslinger (10) Patent No.: US 7,639,249 B2
(45) Date of Patent: Dec. 29, 2009

(54) DIRECT INSET BEVELING OF GEOMETRIC FIGURES

(75) Inventor: Steven P. Kihslinger, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 539 days.

(21) Appl. No.: 11/418,802

(22) Filed: May 5, 2006

(65) Prior Publication Data

US 2007/0257909 A1    Nov. 8, 2007

(51) Int. Cl.
G06T 15/00 (2006.01)
G06T 17/00 (2006.01)
G06T 15/30 (2006.01)
G06T 17/20 (2006.01)
G06T 11/00 (2006.01)
G09G 5/00 (2006.01)

(52) U.S. Cl. ............... 345/419; 345/420; 345/423; 345/467; 345/471; 345/620; 345/621; 345/622

(58) Field of Classification Search ............ 345/419, 345/420, 423, 467, 620–628; 715/256, 269, 715/270, 726
See application file for complete search history.

(56) References Cited

U.S. PATENT DOCUMENTS

| | | | | |
|---|---|---|---|---|
| 5,369,737 A * | 11/1994 | Gholizadeh et al. | ......... | 345/426 |
| 5,377,320 A * | 12/1994 | Abi-Ezzi et al. | ............ | 345/502 |
| 5,448,686 A * | 9/1995 | Borrel et al. | ................ | 345/420 |
| 5,516,748 A * | 5/1996 | Guo | ........................... | 504/362 |
| 5,689,577 A | 11/1997 | Arata | ....................... | 382/128 |
| 5,936,628 A | 8/1999 | Kitamura et al. | ............ | 345/420 |
| 5,990,897 A * | 11/1999 | Hanratty | ...................... | 345/420 |
| 6,045,584 A | 4/2000 | Benzel et al. | ................. | 716/11 |
| 6,115,046 A * | 9/2000 | Chen et al. | ................. | 345/420 |
| 6,246,805 B1 * | 6/2001 | Sanjeev et al. | ............. | 382/285 |
| 6,404,435 B1 * | 6/2002 | Miller et al. | ................. | 345/468 |
| 6,512,522 B1 * | 1/2003 | Miller et al. | ................. | 345/474 |
| 6,515,660 B1 * | 2/2003 | Marshall et al. | ............. | 345/420 |
| 6,545,674 B1 * | 4/2003 | Lin | ........................... | 345/419 |
| 6,549,201 B1 * | 4/2003 | Igarashi et al. | ............. | 345/423 |
| 6,563,501 B2 * | 5/2003 | Sfarti | ........................ | 345/442 |
| 6,577,317 B1 | 6/2003 | Duluk, Jr. et al. | ........... | 345/506 |
| 6,650,324 B1 * | 11/2003 | Junkins | ...................... | 345/423 |
| 6,674,430 B1 | 1/2004 | Kaufman et al. | ............ | 345/419 |
| 6,682,684 B1 * | 1/2004 | Jamalabad et al. | .......... | 264/308 |
| 6,704,018 B1 * | 3/2004 | Mori et al. | .................. | 345/502 |
| 6,816,169 B2 * | 11/2004 | Cosman | ...................... | 345/611 |
| 6,816,170 B1 * | 11/2004 | Udeshi | ........................ | 345/660 |

(Continued)

OTHER PUBLICATIONS

Maya Unlimited 2.0, User's Guide © 1998-1999, 104 pages, http://caad.arch.ethz.ch/info/maya/manual/MasterIndex.html.*

(Continued)

*Primary Examiner*—Ulka Chauhan
*Assistant Examiner*—Roberta Prendergast
(74) *Attorney, Agent, or Firm*—Merchant & Gould, P.C.

(57) ABSTRACT

Computer-generated images often contain two-dimensional objects that have been converted to three-dimensional objects. The three-dimensional objects appear even more visually appealing when edges of the three-dimensional objects are beveled. A direct insetting process computes a graph of how a shape changes as its edges are swept inwards (or outwards) independently such that the computed graph can be applied to a selected bevel profile to produce an interesting three-dimensional geometry for display.

20 Claims, 10 Drawing Sheets

U.S. PATENT DOCUMENTS

| | | | | |
|---|---|---|---|---|
| 6,850,239 | B2* | 2/2005 | Mochizuki | 345/467 |
| 6,870,535 | B2* | 3/2005 | Hill et al. | 345/467 |
| 7,009,611 | B2* | 3/2006 | Di Lelle | 345/467 |
| 7,053,911 | B2* | 5/2006 | Cosman | 345/611 |
| 7,053,912 | B2* | 5/2006 | Cosman | 345/611 |
| 7,053,913 | B2* | 5/2006 | Cosman | 345/611 |
| 7,245,299 | B2* | 7/2007 | Sfarti | 345/423 |
| 2001/0013866 | A1* | 8/2001 | Migdal et al. | 345/423 |
| 2002/0033821 | A1* | 3/2002 | Sfarti | 345/423 |
| 2002/0050992 | A1* | 5/2002 | Deering | 345/423 |
| 2002/0105515 | A1* | 8/2002 | Mochizuki | 345/419 |
| 2002/0154122 | A1* | 10/2002 | Di Lelle | 345/467 |
| 2002/0190982 | A1* | 12/2002 | Kotcheff et al. | 345/420 |
| 2002/0191863 | A1* | 12/2002 | Biermann et al. | 382/285 |
| 2003/0038813 | A1 | 2/2003 | Lu | 345/582 |
| 2004/0070587 | A1* | 4/2004 | Cosman | 345/620 |
| 2005/0062761 | A1* | 3/2005 | Cosman | 345/620 |
| 2005/0128197 | A1 | 6/2005 | Thrun et al. | 345/421 |
| 2005/0195185 | A1 | 9/2005 | Slabaugh et al. | 345/419 |

OTHER PUBLICATIONS

NB9103463, "High-Speed Polygon Data Volume Reduction Algorithm", IBM Technical Disclosure Bulletin, Mar. 1991,vol. 33, Issue 10B, pp. 463-468.*

NN9304149, "Method of Thinning Polygonal Volume Data for Scientific Visualization", IBM Technical Disclosure Bulletin, Apr. 1993,vol. 36, Issue 4, pp. 149-154.*

Zhou, X., Abel, D. J., and Truffet, D., 1998, "Data Partitioning for Parallel Spatial Join Processing", Geoinformatica, vol. 2, Issue 2, Jun. 1998, pp. 175-204.*

Alias Systems Corp.; "May 7"; http://www.alias.com/eng/products-services/maya/new/demos.html; 2005; 3 pgs.

Cultural Heritage Imaging; "3D *Imaging — Virtual Worlds*"; 2005; 3 pgs.

Boardman, T.; "*Diving Deeper into 3ds max Modeling Techniques*"; http://www.peachpit.com/articles/article.asp?p=169545&seqNum=3&rl=1; Mar. 05, 2004; 9 Pgs.

* cited by examiner

DIRECT INSET BEVELING OF GEOMETRIC FIGURES

BACKGROUND

Computer-generated images are often used when displaying information from a computer. The use of graphics increases the interest factor of a viewer who looks at the displayed information. Often, the information is displayed by rendering two-dimensional objects for a (two-dimensional) display. The two-dimensional objects can be made more interesting to a viewer by rendering the two-dimensional objects as three-dimensional objects. The three-dimensional objects appear even more visually appealing when edges of the three-dimensional objects are beveled.

However, conventional algorithms that use a progressive inset algorithm have various drawbacks. The algorithms that have been employed are relatively slow, which results in excess time being required to render complicated two-dimensional shapes, such as text. The algorithms also produce results of varying acceptability (that are sometimes unacceptable) when computing sufficiently complicated shapes having relatively large bevels.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present disclosure is directed to beveling shapes for display using a direct inset algorithm. The direct inset algorithm uses an insetting process (which "sweeps" the edges of the shape inwards along the bevel profile) and a triangulation process (for turning a three-dimensional surface of the shape into triangles). The insetting process comprises computing a graph of the intersections that occur as the edges of a shape are simultaneously swept inwards ("computing the inset" of a shape) and then applying the computed graph to a selected bevel profile to produce geometrical shapes in three-dimensions. Processing time (especially as compared with the progressive inset algorithm) is saved because computing insets is computationally extensive, and every shape typically has two bevels (for example, one for the top and one for the bottom).

Insetting involves determining an outline of an original shape and using inset steps with which a new outline of the shape is drawn. In an embodiment, the direct inset algorithm determines when the first intersection (of vectored edges in the outline) will occur, and updates the shape appropriately based on the type of intersection, and then repeats this process until there are no more intersections. This results in a small number of large inset steps that saves a lot of processing time as compared with the progressive insetting algorithm, which uses many relatively smaller inset steps of fixed length.

Tests used by the direct inset algorithm often take advantage of properties, such as convexity for example, to reduce the time spent searching for intersections. The direct inset algorithm computes the entire inset graph prior to triangulation, which facilitates rewinding the direct insetter to a previous state if the bevel profile requires it, whereas the progressive insetter cannot be rewound because it does insetting and triangulation all at the same time, and hence does not store any previous states.

These and other features and advantages will be apparent from a reading of the following detailed description and a review of the associated drawings. It is to be understood that both the foregoing general description and the following detailed description are explanatory only and are not restrictive of the invention as claimed. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

DETAILED DESCRIPTION

Figure 1:
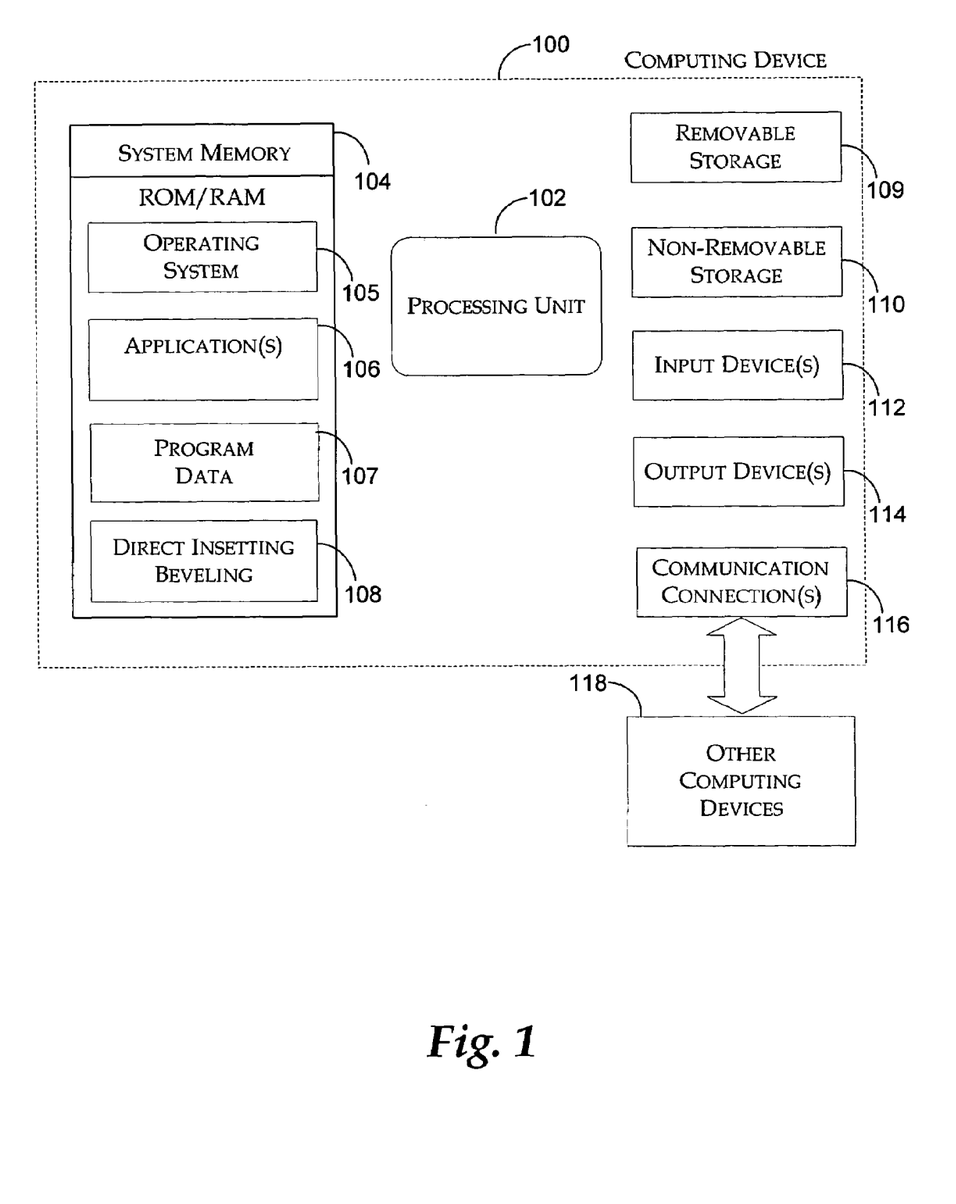
FIG. 1 is an illustration of an example operating environment and system for implementing direct insetting for beveling three-dimensional objects.

As briefly described above, embodiments of the present invention are directed to rendering beveled three-dimensional objects using a direct insetting algorithm. With reference to FIG. 1, one example system for implementing direct insetting for beveling three-dimensional objects includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Direct insetting beveling 108, which are described in detail below with reference to FIGS. 2-5, are implemented within system memory 104. A rasterizer can also be included in system memory 104 or optionally implemented in hardware.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
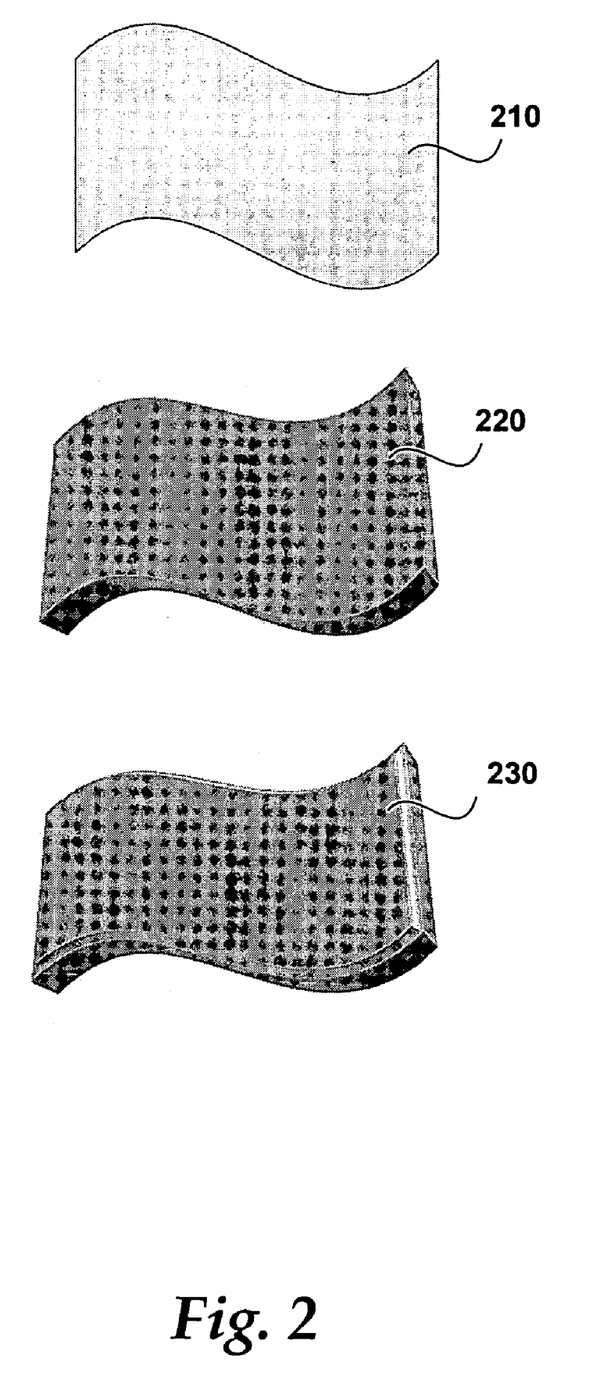
FIG. 2 is an illustration of a two-dimensional object rendered as a three-dimensional object.

FIG. 2 is an illustration of a two-dimensional object rendered as a three-dimensional object. The appearance of a two-dimensional object can be improved by using, for example, the direct inset algorithm to produce a geometry that is used to render the two-dimensional objects as beveled three-dimensional objects. Shape 210 is a two-dimensional object, which is typically a polygon. Shape 220 is similar to shape 210, except that shape 220 has been "extruded" (by extending the two-dimensional object into a third dimension). Shape 230 is somewhat similar to shape 220, except that the upper edges of shape 230 have been beveled, which enhances the appearance of shape 230 with respect to shape 220. The lower edges of shape 230 can be optionally beveled as well, especially when the edges are visible.

Figure 3:
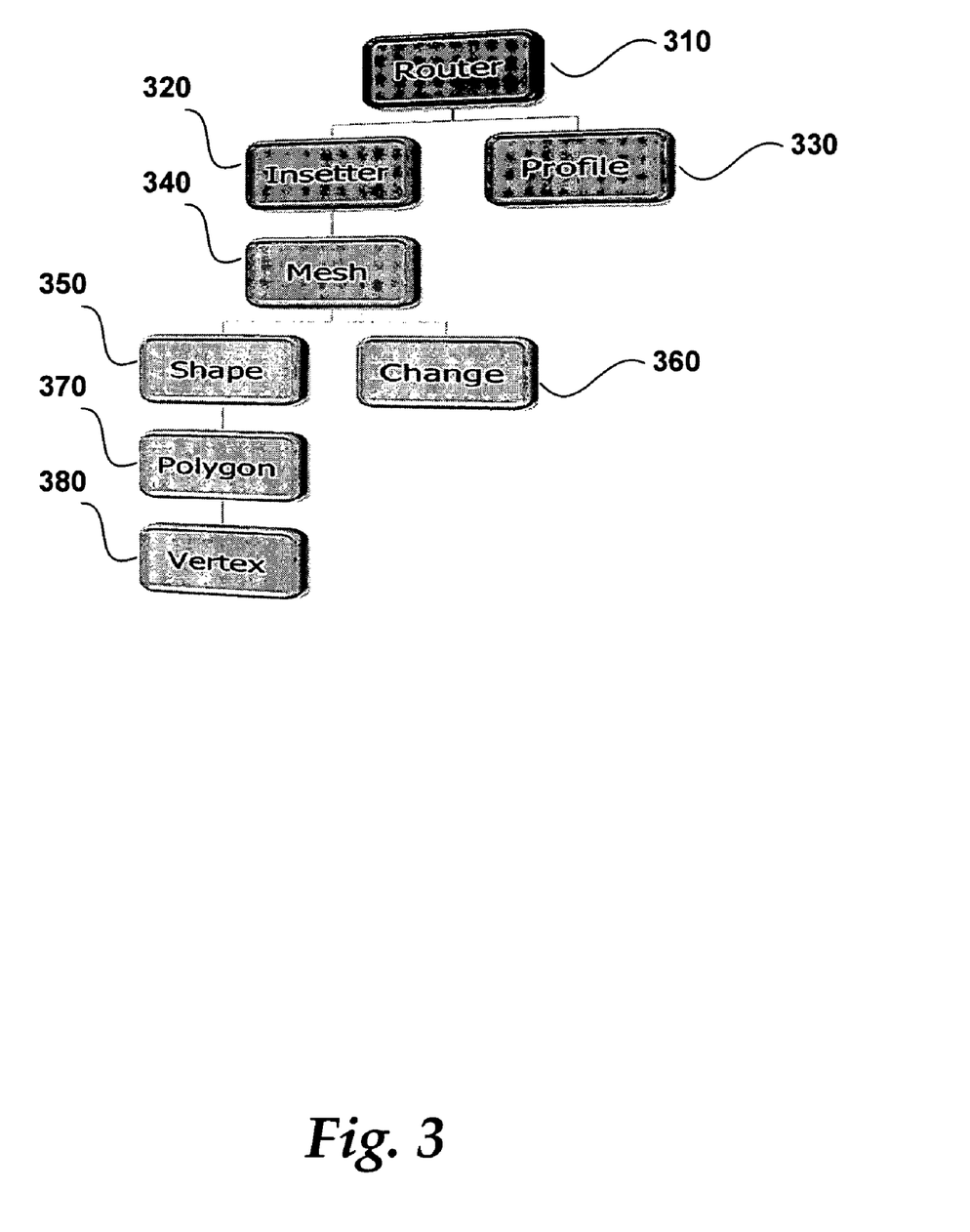
FIG. 3 is an illustration of a class hierarchy for the direct inset object used to execute the direct insetting algorithm.

FIG. 3 is an illustration of a class hierarchy for the direct inset object used to execute the direct insetting algorithm. Router object 310 is a top-level object. Router object 310 uses the insetter object 320 to turn flattened two-dimensional geometry and a bevel profile object 330 into a three-dimensional geometry. An embodiment of router object 310 assumes that the two-dimensional geometry is well-formed, with all individual paths of an outline being closed, such that each of the individual paths do not self-intersect or intersect with each other.

Insetter object 320 is first used to calculate an inset graph of the two-dimensional geometry. Profile object 330 determines a flattened section of the bevel profile and computes normals at each of the flattened profile points for lighting purposes. The normals can be calculated by computing the perpendicular of the tangent of each of the flattened profile points. Each consecutive pair of profile points and associated normals is passed to the insetter object 320 to be triangulated, and the resulting triangles are returned to the caller.

The inset graph for an inwards and outwards direction can be calculated by the direct inset algorithm. The insetter object (320) manages two mesh objects 340, one for insetting in the positive direction, and one for the negative direction ("outsetting"). The negative direction mesh object 340 is typically specified with the exact same set of polygons as the positive direction mesh object 340, except that all of the vertices in the polygons are reversed.

Mesh object 340 further performs an initial classification (such as expanding or shrinking) and sorts of all polygon objects 370, such that each set of related polygon objects 370 are placed in a shape object 350. A polygon object 370 can be simply a collection of points (or vertex objects 380) that define a closed polygonal area. The order of the vertices in polygon object 370 can be used to determine whether the polygon defines the finite interior area (shrinking) or the infinite exterior area (expanding). A shape object 350 typically contains all polygon objects 370 that could possibly intersect with one another during the insetting (or outsetting) process.

Sorting can be illustrated by considering, for example, the letter "o." The letter "o" has two polygon objects 370: one outer polygon and one inner polygon. The outer polygon is "swept" in an inwards direction and the inner polygon is swept in an outwards direction during insetting such that the outer polygon shrinks and the inner polygon expands. Eventually the outer and inner polygons collide and merge into a single polygon. Accordingly, the two polygon objects (370) for the letter "o" are placed into the same shape object 350.

A purpose of the shape object 350 in the hierarchy is to speed up intersection calculation by isolating (into separate buckets) polygon objects 370 that are not expected to intersect with one another. Increasing the speed of the intersection calculation can be illustrated by considering a string of text and the set of polygon objects 370 that define the individual characters of the string of text. During insetting, none of the characters of the text string will typically intersect with each other, so testing for intersections between polygon objects 370 from different characters of the string of text can be omitted.

Vertex object 380 is used to define points that are used for describing a polygon object 370. During the insetting process, a new polygon is formed inside (for example) the old polygon by moving the vertices inwards (relative to the outline of the old polygon) by a selected inset distance. The vertices are swept inwards at an angle that is, for example, normal to the curve defined by the vertex and the adjacent vertices. Sweeping the vertices to determine edges of the new polygon is illustrated below with reference to FIG. 5.

Figure 4:
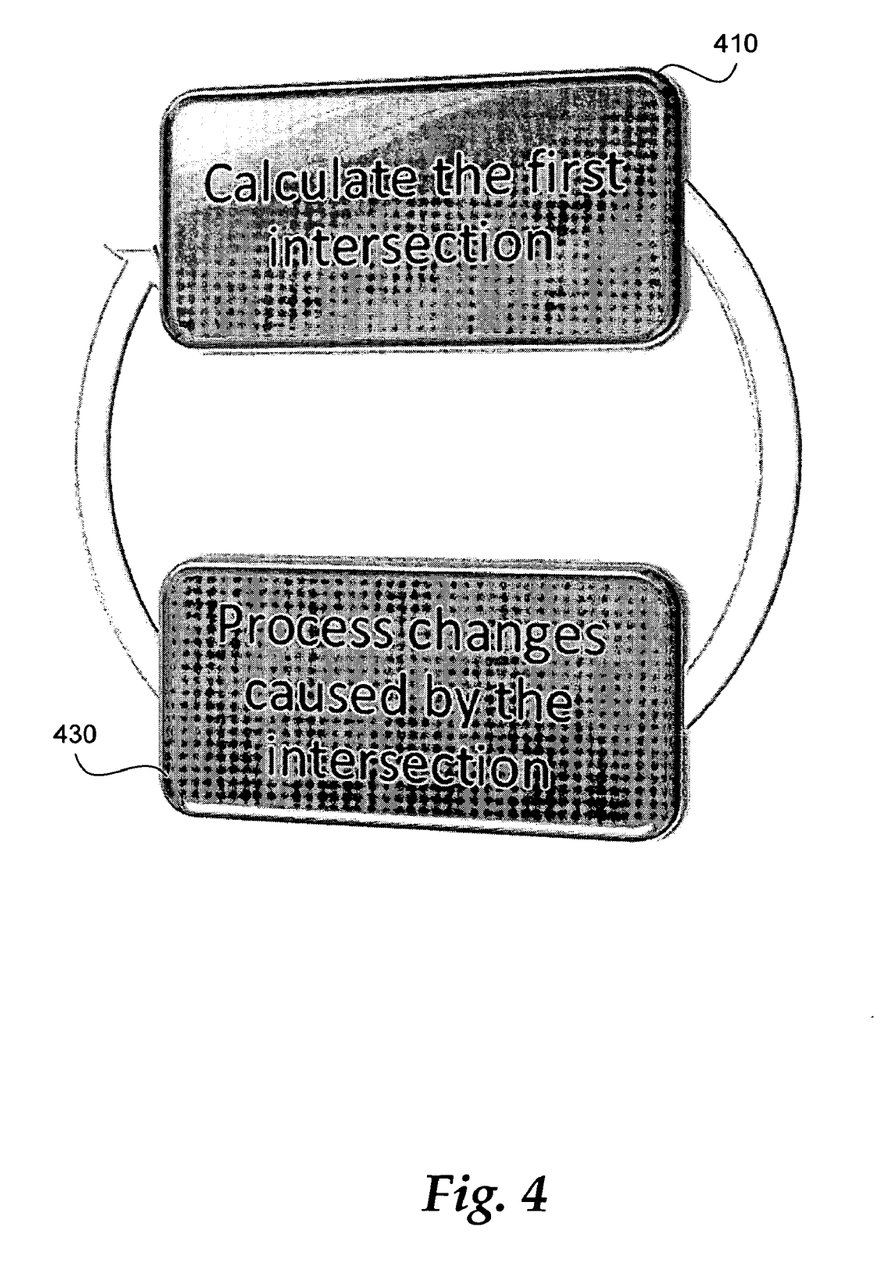
FIG. 4 is a flow graph illustrating a portion of the insetting process.

Change object 360 is described below with reference to FIG. 4. Referring now to FIG. 4, a flow graph of a portion of the insetting process is illustrated. After the initial sort (as described above with reference to FIG. 3), the inset process can be implemented as a loop (as shown by operations 410, and 430) that is repeated until there are no intersections left to process (In the case of shrinking polygons, there are no intersections left when all the area of the original two-dimensional geometry has collapsed down to no area. In the case of expanding polygons, there are no intersections left when the polygon becomes convex, as all vertices diverge infinitely.

In operation 410, a first intersection is calculated. The first intersection is calculated by sweeping an edge (including the entire path or a segment of the outline) of a polygon until an intersection occurs. If no intersection occurs during a first sweep, the edge is iteratively swept by the inset distance at a normal angle such that a new polygon is formed until an intersection occurs. The intersection occurs when a swept polygon edge intersects with the edge of another polygon (or another portion of the edge of the same polygon) or when vertices of the same polygon intersect.

In operation 430, the changes caused by the intersection are processed by merging the polygons, forming new polygons out of the old polygon, or vertices of a polygon merged (or deleted). The changes are processed in accordance with the type of intersection that is calculated in operation 410. Change object 360 can be used to process and store the changes.

Movement of polygon vertices while sweeping the polygon edges (as described herein) of polygons in shape object 350 can cause three different types of changes: Polygon Merges, Polygon Splits, and Vertex Merges. A polygon merge change occurs when two separate polygon objects 370 collide (by touching or intersecting, for example), where the separate polygon objects 370 merge into a single polygon object 370. A polygon split change occurs when a polygon object 370 collides with itself, where the single polygon object 370 splits into two new polygon objects 370. A vertex merge occurs when two or more adjacent vertex objects 380 in a polygon object 370 collide, where the adjacent vertices merge into a single vertex object 380. Examples of a polygon merge, a polygon split, and a vertex merger are given below with respect to FIGS. 6-8.

Ultimately, a polygon that is swept inwards can be merged into a single vertex object 380 (a point) or merged into two vertex objects 380 (a line segment), at which point no area exists and the polygons can be removed. When there are no polygons left, there will be no more intersections, and the insetting process is complete.

Figure 5:
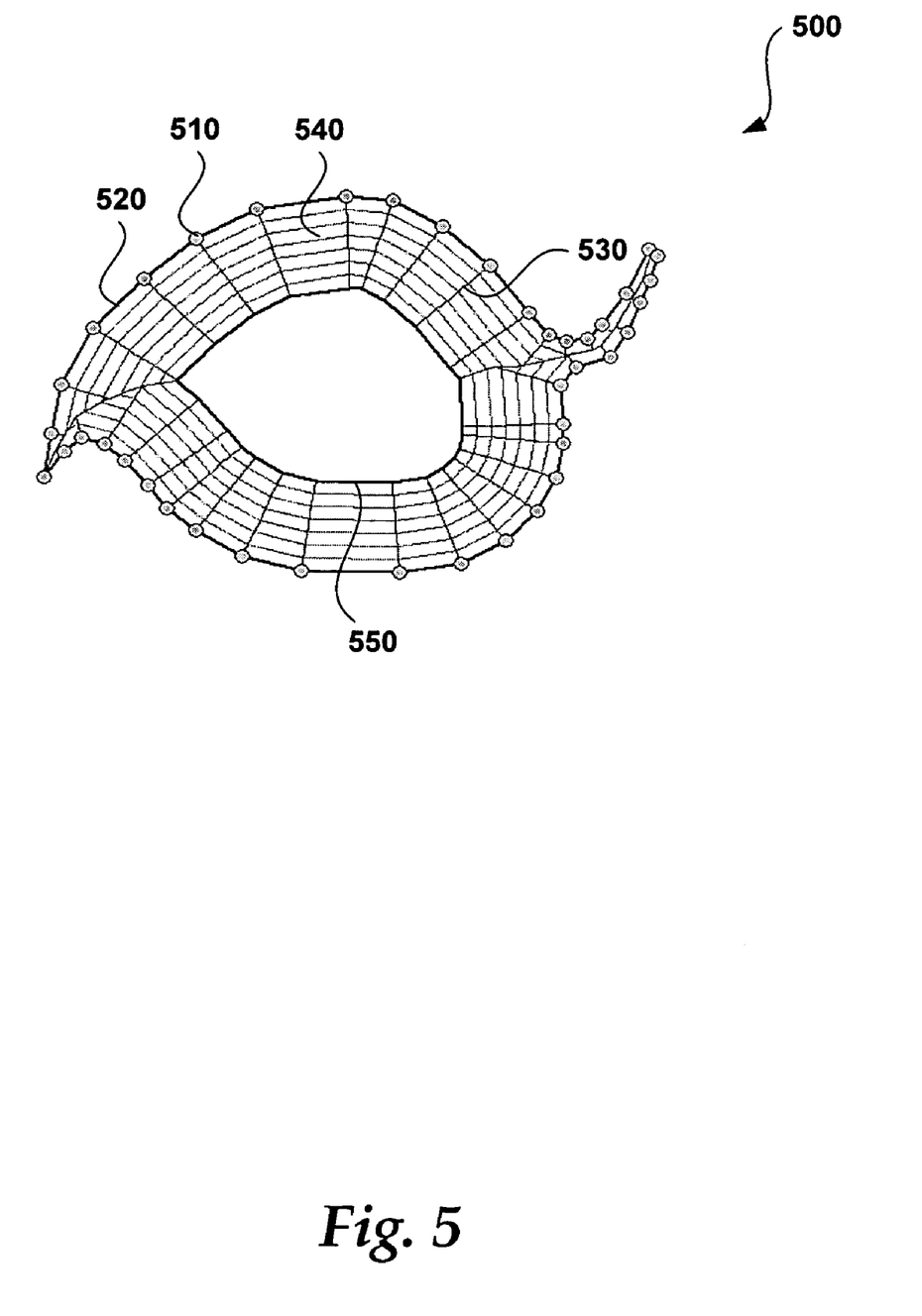
FIG. 5 is an illustration of a partial inset graph 500 that is generated by a direct inset algorithm.

FIG. 5 is an illustration of a partial inset graph 500 that is generated by a direct inset algorithm. Vertices 510 and segments 520 define an original polygon. Tracing lines 530 show the movement of the vertices as the edges of the polygon are swept. The intermediate polygons (540) show previous levels of insetting, whereas the inside polygon (550) shows a current state of the insetter object (320).

Triangulation is used to generate a geometry for rendering. Insetter object 320 is passed a profile segment from the profile curve. A profile segment typically comprises two points on the profile curve and their corresponding normals. The profile curve can be generated from a mathematical function for a curve, or can be, for example, a series of curves such as those found on trim panels and moldings. The profile curve is used to produce the profile of the beveled edge.

During triangulation, each consecutive pair of profile points and associated normals are iteratively passed to the insetter object 320. For each pair of points, the insetter is traversed from the start profile point to the end profile point. At each change in between the two points, the insetter outputs three-dimensional vertices (position and normal vectors) and stretches triangles between these vertices. All of the resulting three-dimensional vertices and triangles are grouped together and returned to the caller.

Figure 6:
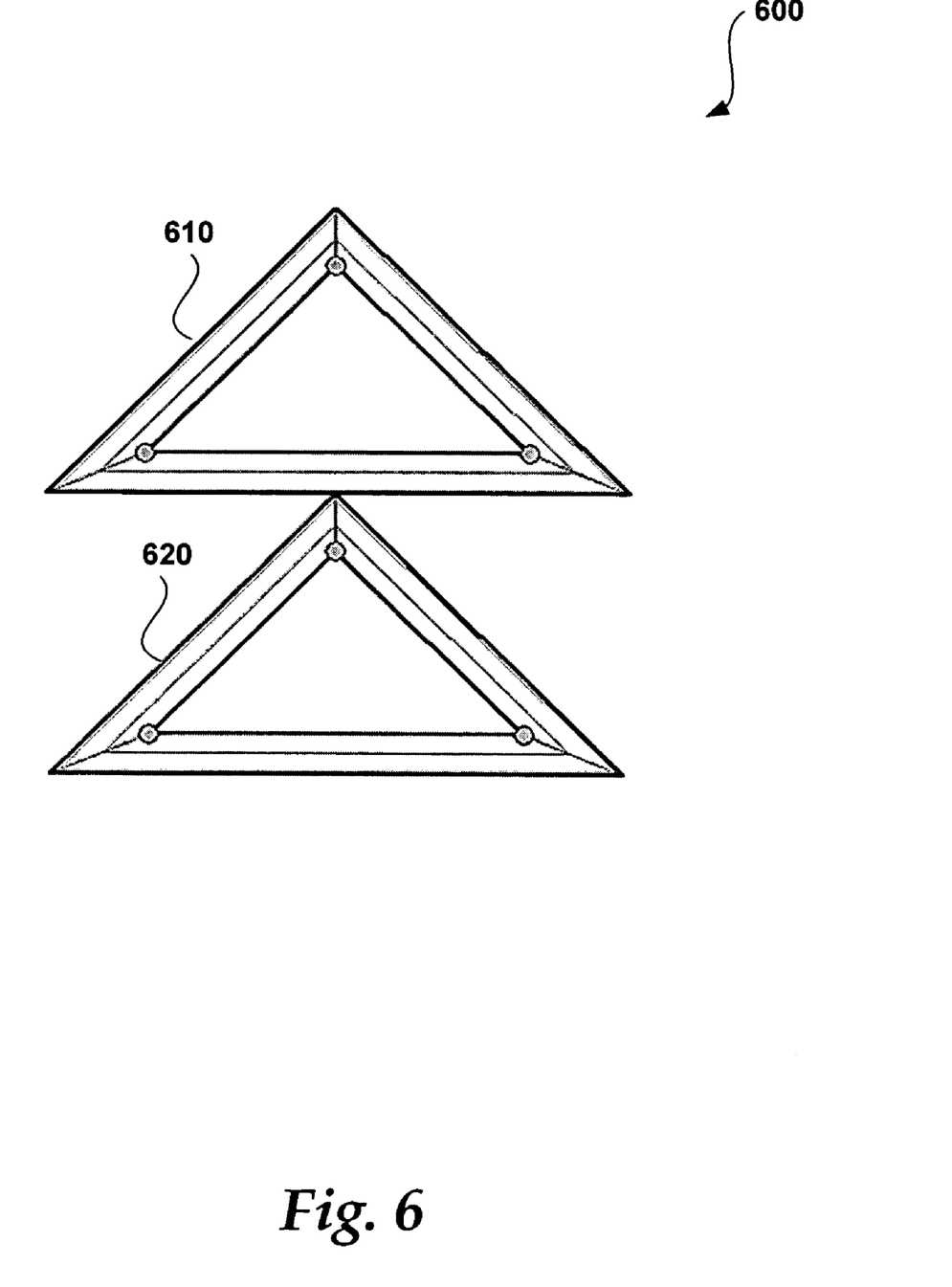
FIG. 6 is an illustration of a partial inset graph 600 for a polygon merge that is generated by a direct inset algorithm.

FIG. 6 is an illustration of a partial inset graph 600 for a polygon merge that is generated by a direct inset algorithm. Polygons 610 and 620 are merged as the polygon edges are swept outwards.

Figure 7:
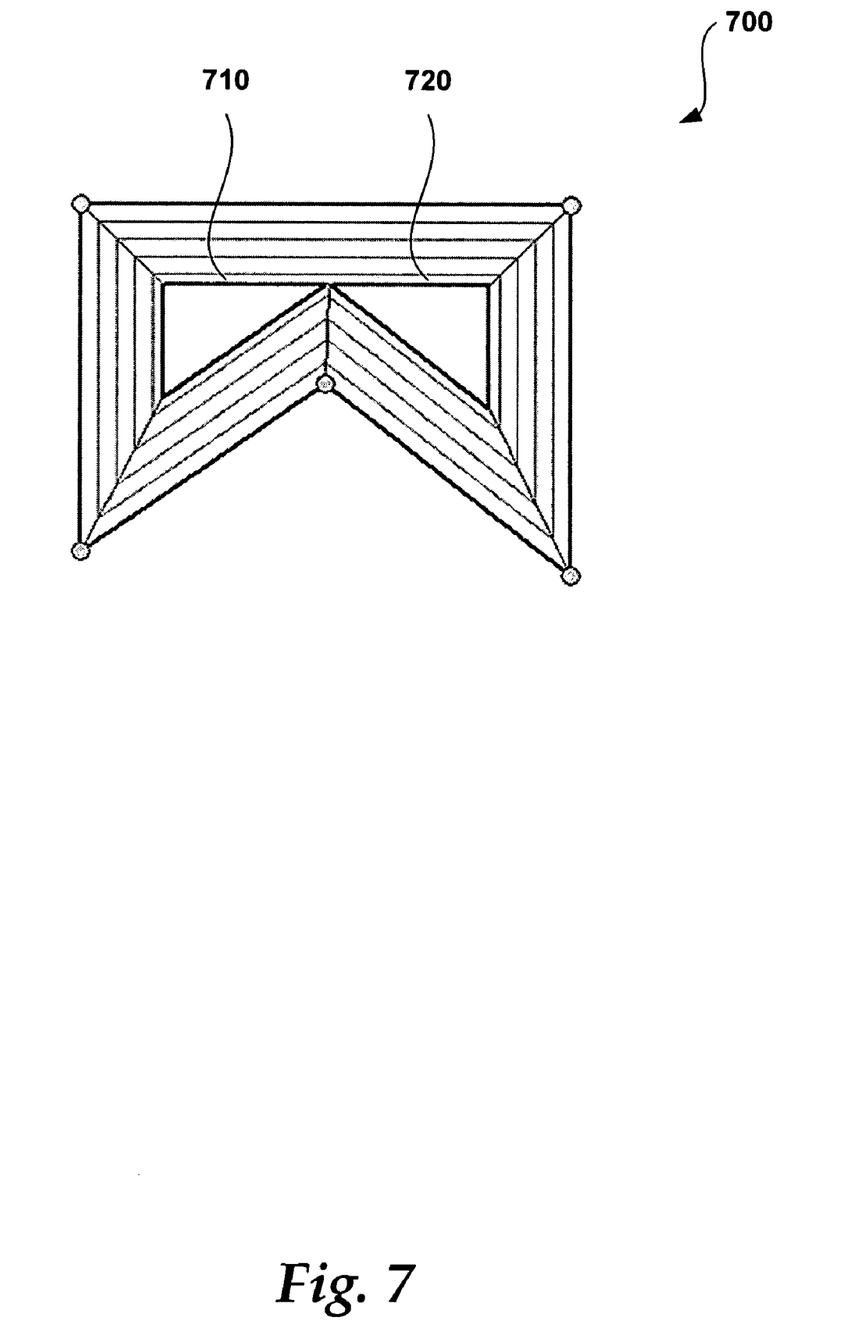
FIG. 7 is an illustration of a partial inset graph 700 for a polygon split that is generated by a direct inset algorithm.

FIG. 7 is an illustration of a partial inset graph 700 for a polygon split that is generated by a direct inset algorithm. Polygons 710 and 720 are formed as polygon edges are swept inwards.

Figure 8:
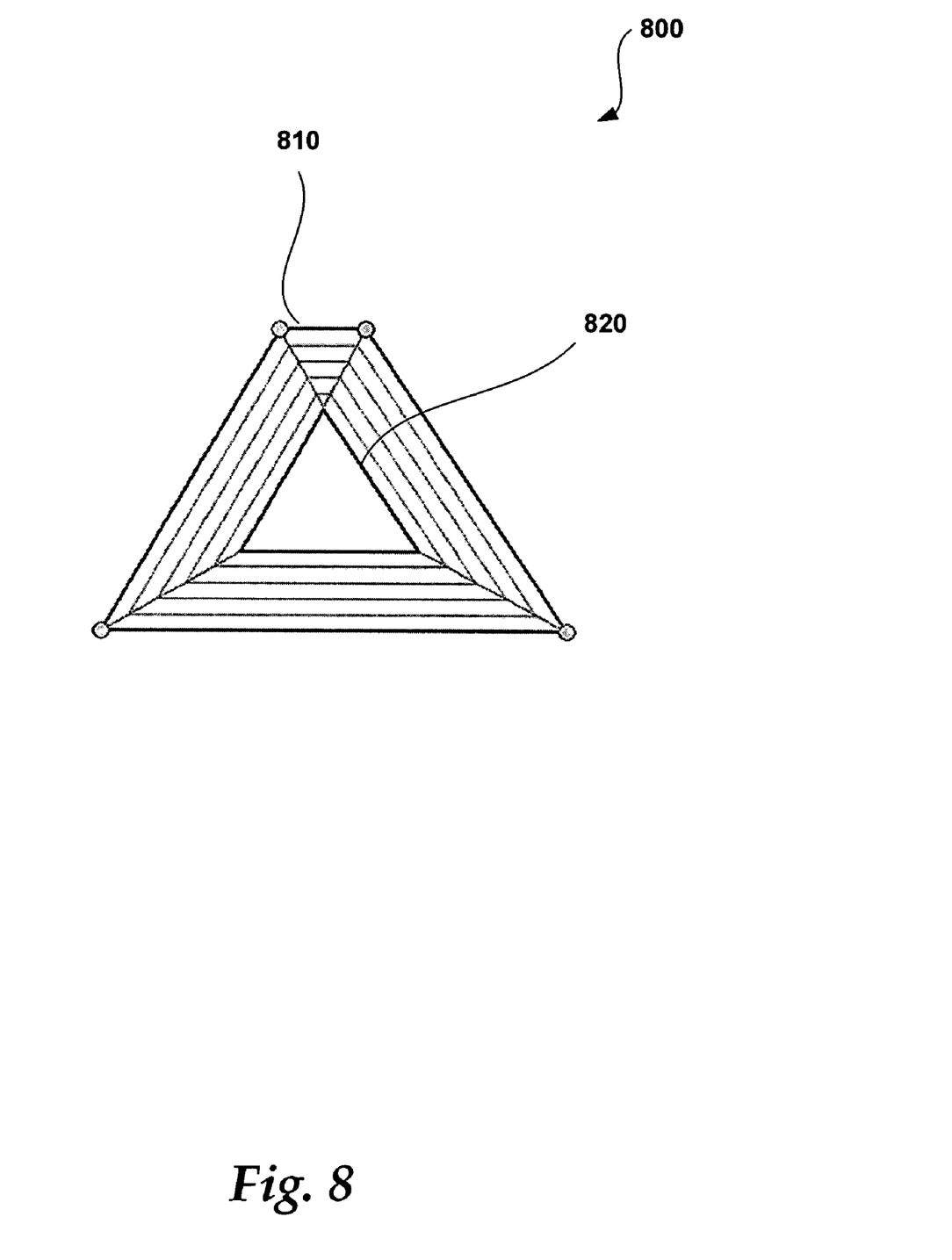
FIG. 8 is an illustration of a partial inset graph 800 for a vertex merge that is generated by a direct inset algorithm.

FIG. 8 is an illustration of a partial inset graph 800 for a vertex merge that is generated by a direct inset algorithm. The vertices of edge 810 are merged when Polygons 820 is formed as the polygon edges are swept inwards.

Figure 9:
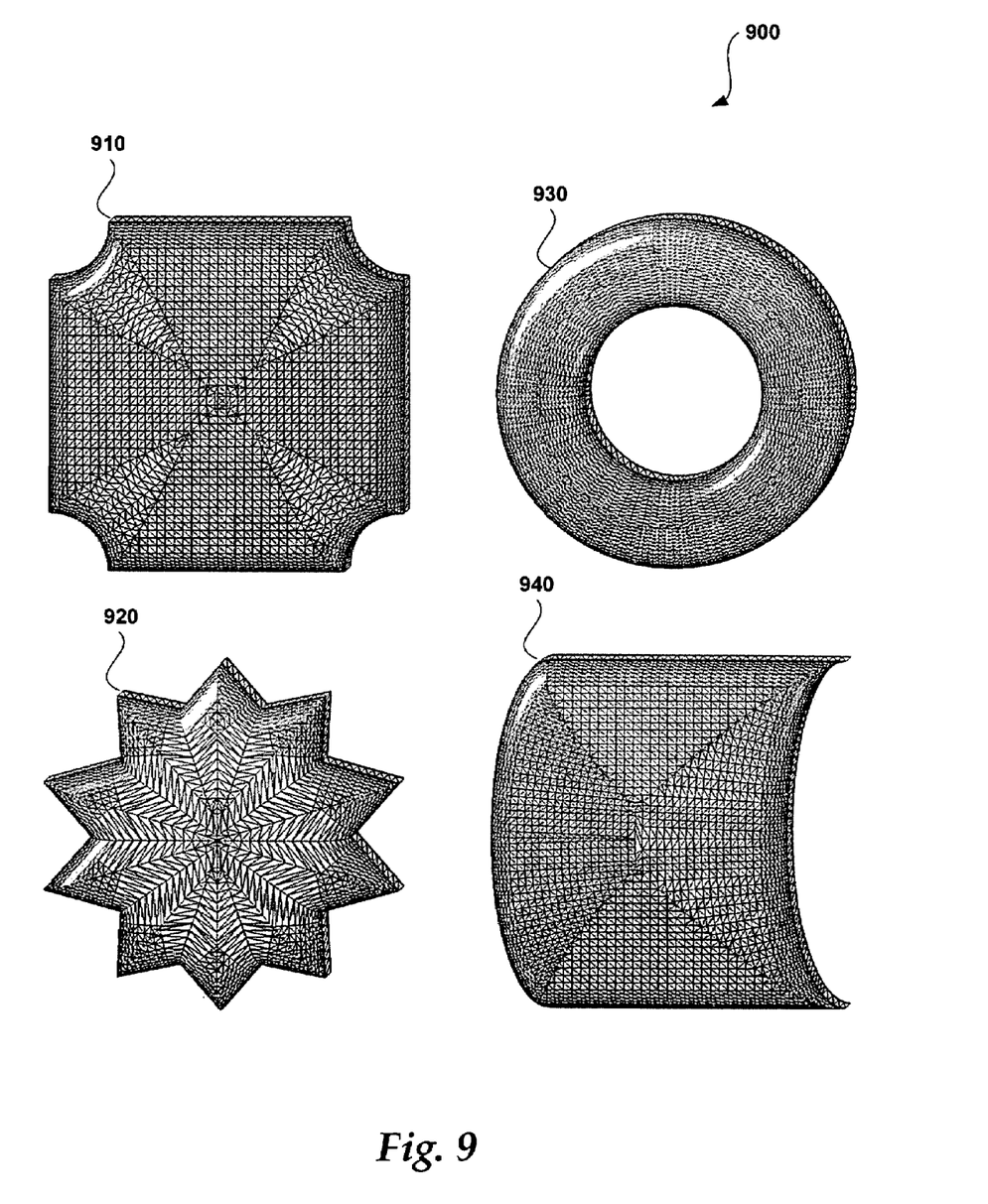
FIG. 9 is an illustration of a highly tessellated beveled geometries that are generated by a direct inset algorithm.

FIG. 9 is an illustration of a highly tessellated beveled geometries that are generated by a direct inset algorithm 900. Geometry 910 is formed from a square having inset corners. Geometry 920 is formed from a 10-pointed star. Geometry 930 is formed from an "O"-shaped concentric circles. Geometry 940 is formed from a cylindrical surface.

Figure 10:
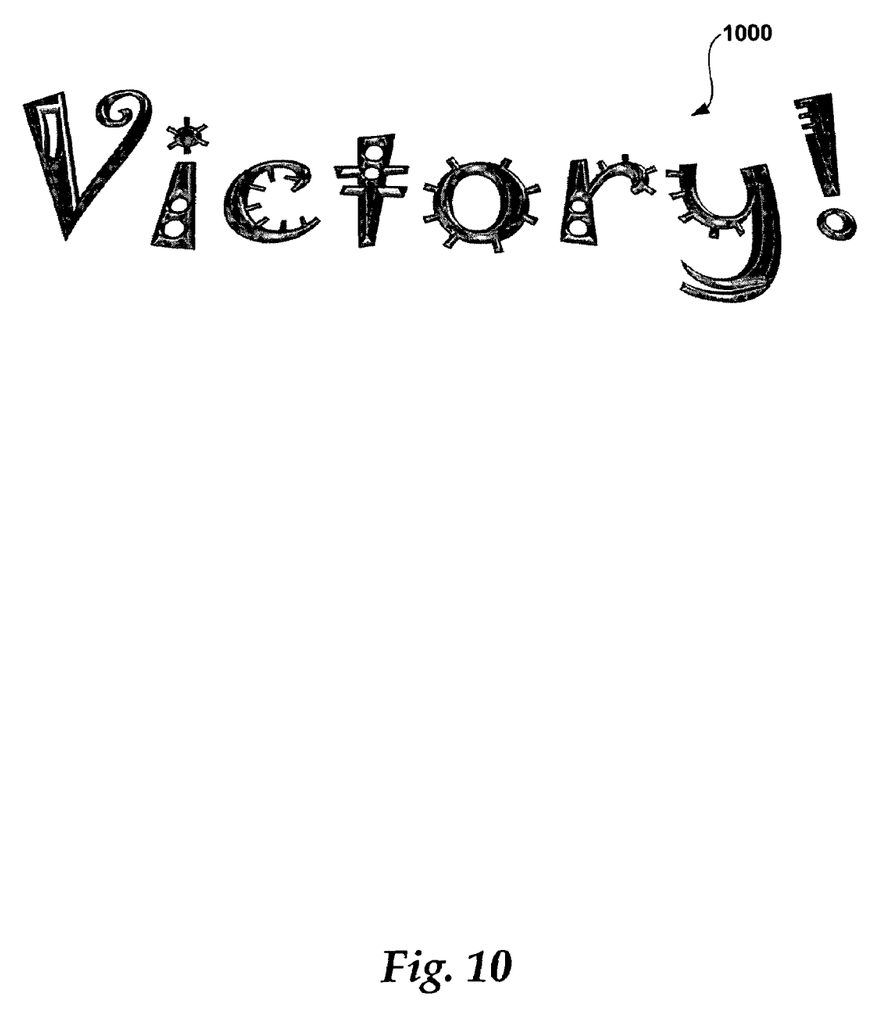
FIG. 10 is an illustration of text having a rather complex font rendered according to a geometry generated by a direct inset algorithm.

FIG. 10 is an illustration of text having a rather complex font rendered according to a geometry generated by a direct inset algorithm 1000. The geometry is rendered showing beveled edges and lighting effects to produce a more convincing three-dimensional appearance.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method for direct inset beveling of a geometric shape, the method being executed by a processor, comprising:
   accessing the geometric shape, wherein the geometric shape comprises polygon objects, wherein each of the polygon objects defines a closed polygonal area;
   sorting the polygon objects into groups, wherein the polygon objects that do not intersect with each other are placed into different groups, wherein testing of an intersection of polygon objects is not performed on the polygon objects that are associated with different groups, and for the polygon objects that are associated with the same group, then for each group:
   sweeping the edges of a polygon geometric shape to determine the first intersection between any two edges; and
   processing changes caused by the intersection in response to the kind of intersection determined; wherein processing the changes caused by the intersection comprise: merging the polygons; forming new polygons out of the old polygon or vertices of a polygon that have been merged or deleted.

2. The method of claim 1 wherein the kind of intersection is a polygon merge.

3. The method of claim 1 wherein the kind of intersection is a polygon split.

4. The method of claim 1 wherein the kind of intersection is a vertex merge.

5. The method of claim 1 further comprising associating geometric shapes on the basis of whether common intersections would occur.

6. The method of claim 1 wherein the polygons are updated when an intersection occurs.

7. The method of claim 1 wherein the operations of claim 1 are repeated until the sweeping leaves no intersections to process.

8. The method of claim 1 further comprising providing a bevel profile for selecting the appearance of a rendered edge of the polygon.

9. The method of claim 8 further comprising forming a three-dimensional mesh object using the first edge and the bevel profile.

10. The method of claim 1 further comprising rendering a mesh object.

11. The method of claim 1 wherein the edges of the geometric shape are swept by in an inwards direction.

12. The method of claim 1 wherein the edges of the geometric shape are swept by insetting vertices of the geometric shape by a predetermined distance.

13. The method of claim 12 wherein the edges of the geometric shape are swept by in a direction that is determined by the normals of the vertices.

14. A system for direct inset beveling of a geometric shape, comprising:
a processor and a computer-readable storage medium;
a mesh object executing on the processor that is configured for determining a direction for sweeping polygons of the geometric shape, associating the polygons into groups; wherein the polygons that do not intersect with each other are placed into different groups; wherein testing of an intersection of polygons is not performed across groups; and storing associated polygons related polygon objects using shape objects;
an insetter object for sweeping the polygons; and
a profile object for determining a flattened section of a bevel profile and computing normals at each of the flattened profile points.

15. The system of claim 14 wherein the insetter object is further arranged to triangulate the mesh object.

16. The system of claim 14 further comprising a user interface to select the profile object.

17. A computer-readable storage medium comprising computer-executable instructions executed by a processor for:
accessing a geometric shape, wherein the geometric shape comprises polygon objects, wherein each of the polygon objects defines a closed polygonal area;
sorting the polygon objects into groups, wherein the polygon objects that do not intersect with each other are placed into different groups, wherein testing of an intersection of polygon objects is not performed on the polygon objects that are associated with different groups, and for the polygon objects that are associated with the same group, then for each group:
iteratively sweeping an edge of a polygon object to determine a kind of an intersection of the edge with itself or a swept edge of another polygon; and
processing changes caused by the intersection in response to the kind of intersection determined.

18. The computer-readable storage medium of claim 17 wherein the kind of intersection is a polygon merge.

19. The computer-readable storage medium of claim 17 wherein the kind of intersection is a polygon split.

20. The computer-readable storage medium of claim 17 wherein the kind of intersection is a vertex merge.

* * * * *